July 23, 1963     T. J. GRUBER     3,098,500
BROKEN DISCHARGE LINE INDICATOR
Filed Sept. 11, 1961     2 Sheets-Sheet 1

INVENTOR.
THOMAS J. GRUBER
BY
Oberlin, Maky & Donnelly
ATTORNEYS

July 23, 1963

T. J. GRUBER 3,098,500

BROKEN DISCHARGE LINE INDICATOR

Filed Sept. 11, 1961

INVENTOR.
THOMAS J. GRUBER
BY
Oberlin, Maky & Donnelly
ATTORNEYS

United States Patent Office 3,098,500
Patented July 23, 1963

3,098,500
BROKEN DISCHARGE LINE INDICATOR
Thomas J. Gruber, Chagrin Falls, Ohio, assignor to Eaton Manufacturing Company, Cleveland, Ohio, a corporation of Ohio
Filed Sept. 11, 1961, Ser. No. 137,414
20 Claims. (Cl. 137—456)

This invention relates generally, as indicated to a broken discharge line indicator and more particularly to a broken line indicator and shut-off for lubricating systems and the like.

In lubricating systems, it has always been a problem to detect and stop leaks and line breaks, and moreover, continued pressure in a leaking line may tend to worsen the situation and cause greater line damage. After the leak has been detected and corrected, indicators or shut-offs must generally be manually reset after the proper line pressure has been obtained. Furthermore, if the pressure in the entire system falls below a predetermined amount, all of the indicators may have to be manually repositioned before the system can again be put in proper operation. Since various types of lubricating systems are employed in supplying lubricants such as grease or oil to bearings in many types of extensive machinery such as mill stands, coilers, shears, etc. in strip mills, punches, presses and the like, the manual resetting of indicators could be an extensive and time-consuming job.

It is accordingly a principal object of the present invention to provide a broken line indicator and shut-off for lubricating systems and the like which will automatically be rest upon an increase in line pressure.

It is another main object to provide a broken line indicator which will shut off a lubricating line at a predetermined minimum pressure in the discharge line providing an indication thereof.

It is another object to provide a broken line indicator and shut-off for lubricating systems which can be operated by a pilot piston which is in turn operated by the pressure in the fluid line.

It is still another object to provide such broken line indicator wherein the pilot piston will return to its original position after it has moved the indicator piston to expose an end thereof to the pressure in such fluid line.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
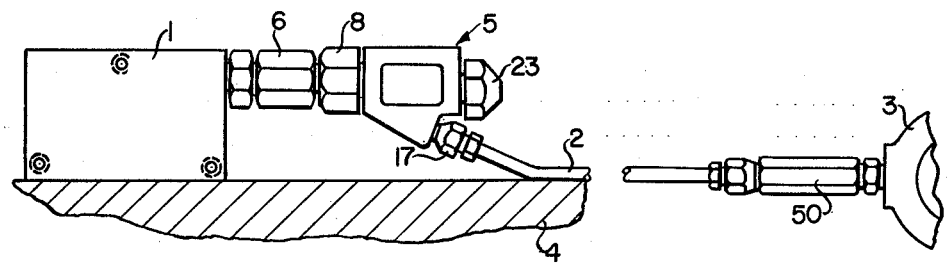
FIG. 1 is a fragmentary somewhat schematic elevation of a lubricant metering valve and bearing to be lubricated with a broken line indicator in accordance with the present invention incorporated in the line therebetween.

Referring now to the annexed drawings and more particularly to FIG. 1, there is shown a lubricant metering valve 1 which supplies a measured amount of lubricant under pressure through discharge line 2 to a bearing 3. The metering valve may be mounted on the side of a machine frame, such as a press or roll stand shown generally at 4. Whereas the present invention may be employed preferably with a single line progressive system, it may also be used with dual line progressive and predetermined pressure systems and reference may be had to Acker Patent No. 2,708,984 and Graves Patent No. 2,856,023 for disclosures of metering valves that may be employed with the present invention.

Figure 2:
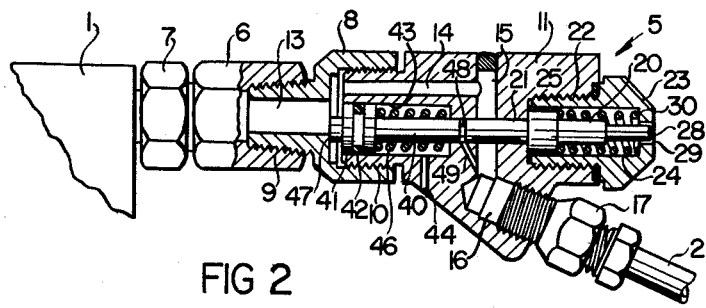
FIG. 2 is a fragmentary sectional view of one form of broken line indicator in accordance with the the present invention showing the indicator piston thereof in line blocking position.

The broken line indicator and shut-off shown generally at 5 is mounted directly on the metering valve 1 and referring additionally to FIG. 2, fluid under pressure for the intial operation will be discharged from the metering valve 1 through a low pressure one-way check valve 6 which may be coupled directly to the discharge port of the valve 1 by a union 7. An adapter 8 may be internally connected to the check valve 6 by tapered threads shown generally at 9 and the enlarged portion thereof may be threadedly connected at 10 to the body 11 of the indicator 5. It will, of course, be understood that in certain measuring valves, the check valve 6 may be located internally in the body of the valve 1.

Fluid in the form of lubricant or oil passes from the check valve 6 into a chamber 13 and passages 14 and 15 in the body 11. The passage 15 leads to an enlargement 16 which is tapped and provided with a coupling 17 for the discharge line 2. The passage 15, however, in the position shown in FIG. 2 is blocked by an indicator piston 20 mounted in bore 21 which extends normal to the passageway 15. The bore 21 is provided with an end enlargement tapped as shown at 22 to receive indicator stem housing 23 which is provided with an internal bore 24 extending coaxially and concentrically with the bore 21 in the body 11. The bore 24 accommodates an enlarged portion or shoulder 25 of the indicator piston 20 which is of somewhat smaller diameter than the bore to allow clearance therearound. A reduced diameter end portion or stem 28 is aligned with and projects into opening 29 in the end of a stem housing 23. A spring 30 extends between the enlarged portion 25 of the indicator piston and the end wall of the housing 23. This spring urges the indicator piston to the left as seen in FIG. 2 or to its line blocking position.

Positioned in series or in tandem with the indicator piston in the bore 21, there is provided a pilot piston 40 having an enlarged portion 41 provided with an O-ring 42 seating such enlarged portion within bore enlargement 43 which is coaxial with the bore 21. A vent passage 44 connects the bore enlargement to atmosphere. A spring 46, extending between the enlarged portion 41 of the pilot piston and the end or shoulder provided by the juncture between the bore 21 and enlarged portion or chamber 43, urges such pilot piston to the left as seen in FIG. 2 and a stop 47 limits the extent of movement of such piston. A stop 48 on the opposite end of the pilot piston also slightly spaces the pilot piston from the indicator piston and provides a small annular recess or by-pass between the two pistons. A vent passage 49 leads from such annular recess in the position of the indicator and pilot pistons shown in FIG. 2 to the chamber 16.

In the initial operation when lubricant is discharged from the metering valve, such lubricant is unable to flow to chamber 16 and thus through the line 2 because of the indicator piston blocking the passage 15. The indicator piston is held in such position by the spring 30 and also the pilot piston is held in the FIG. 2 position by the spring 46. Since the fluid pressure becomes dead-ended, the metering piston in metering valve 1 is unable to move.

Figure 5:
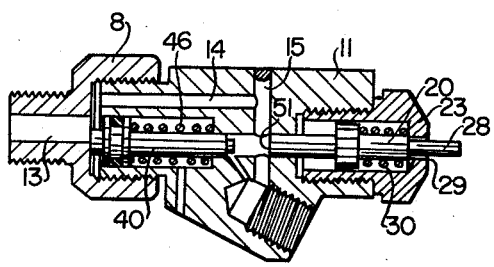
FIG. 5 is a fragmentary sectional view of a broken line indicator similar to that shown in FIG. 2 with the indicator piston thereof extended and in line opening position.

When travel of the metering piston is prohibited and the pumping system continues to operate, a high pressure feed back or pressure build up occurs from the point of stoppage. Pressure build up may operate a warning device located at the central control point of the system indicating a line blockage. Fluid under high pressure is also, of course, exerted on the metering piston which in turn exerts a high pressure on the fluid or lubricant between the end of the metering piston and the end of pilot piston 40 which is exposed to such pressure in chamber 13. Fluid under high pressure causes the pilot piston 40 to overcome the resistance created by its spring 46 and as a result, the pilot piston will move to the right in FIG. 2 pushing the indicator piston against the pressure of spring 30 to a point where the end of the indicator piston 20 is exposed to the line pressure in passage 15 which is the same as the line pressure in chamber 13. When the annular recess provided by the stop 48 enters the passage 15, the fluid under pressure begins normal flow therethrough and the indicating stem 28 will project outwardly of the housing portion 23 as shown in FIG. 5 and be held there as the result of the fluid pressure in passage 15 being sufficient to overcome the resisting force of spring 30.

The magnitude of force provided by the spring 30 may be preselected to be less than the normal range of force provided on the now exposed end of the indicator piston by a normal range of 150 to 300 p.s.i. in the passage 15. Accordingly, when the fluid pressure returns to its normal range after the initial build-up, the indicator piston will remain in its extended position and allow the fluid pressure to pass through the passage 15, chamber 16 and through the discharge line 2 and through a high pressure one-way check valve 50 located at the bearing 3.

The strength or magnitude of force of spring 46 may also be selected such that as the fluid pressure drops to the aforesaid normal operating range, the pilot piston 40 will return to its original position due to the force being exerted by spring 46 which is greater than that exerted by spring 30. The magnitude of force exerted by the spring 46 may, for example, be approximately in the range of 1,000 to 1,500 p.s.i. and such will cause the pilot piston to return to its original position displacing fluid within the enlargement 43 into the passages 14 and 15 through chamber 16 into the discharge line 2. Under normal conditions, the pilot piston 40 will remain dormant in substantially the position shown in FIG. 5. The pressure acting on the now exposed end 51 of the indicator piston 20 will maintain the spring 30 compressed and the stem 28 projecting through the opening 29 with the shoulder between the stem and the piston abutting against the inside wall of the housing 23. The exposed stem then indicates that the passage 15 is opened and sufficient pressure is provided therein to hold the indicator piston in its extended position against the pressure of spring 30.

If a leaking or broken discharge line occurs anywhere between the bearing 3 and the indicator 5, the malfunction will generally not register at the central control area, due to the drop in line pressure. However, when the fluid pressure in the discharge line drops below the normal operating range required to maintain the piston 20 in the extended position shown in FIG. 5, the spring 30 will exert a sufficient amount of force to move the piston 20 to the left causing that portion of the piston which fits within the bore 21 to seal the passage 15 from the chamber 16. Fluid displaced by the end of the piston 20 will move through the vent passage 49 and the stem 28 will then be withdrawn into the housing 23 as seen in FIG. 2.

This then provides the observer with positive visual proof of a broken or leaking discharge line. Continued operation of a progressive system initiates a high back pressure which can be detected at the central point of the system through the aid of a high pressure indicator which will signal an alarm device either visual or audible. It is then a relatively easy task to determine where the malfunction lies through visual inspection of the broken discharge line indicators.

After the broken or leaking line has been traced and the malfunction corrected, the system will then return to normal operating condition by fluid pressure exerting an increased force on the exposed end of pilot piston 40 which will in turn move the indicator piston to the point where normal operating pressures will again maintain the indicator piston in its extended position. The pilot piston will then return to its original position as the result of the force of spring 46. It can now be seen that the indicator piston due to the action of the pilot piston is automatically placed in operating position and need not be manually reset when the proper high pressure is obtained.

Figures 3, 4:
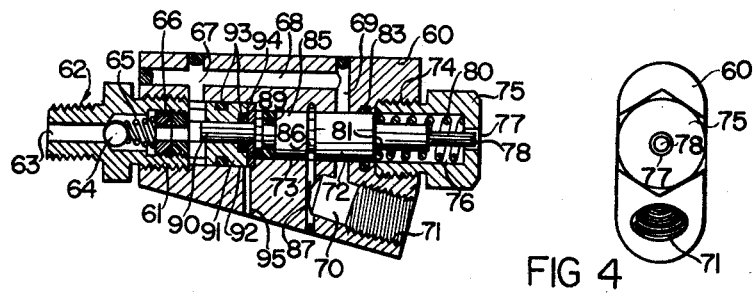
FIG. 3 is a similar section of another form of broken line indicator in accordance with the present invention also showing the indicator piston thereof in line blocking position.
FIG. 4 is an end elevation of the FIG. 3 embodiment as seen from the right thereof.
Figure 6:
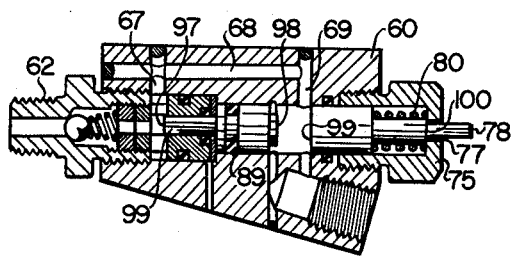
FIG. 6 is a fragmentary sectional view of the broken line indicator of FIG. 3 with the indicator piston thereof extended and in line opening position.

Referring now to the embodiment of the invention disclosed in FIGS. 3, 4 and 6, there is indicated a broken line indicator and shut-off comprised in a body 60 having a threaded inlet opening 61 receiving a check valve 62. Fluid enters the check valve 62 through passage 63, lifts the ball 64 from its seat against the pressure of spring 65 and passes through annular spring retainers 66 threaded internally in the check valve. From there, fluid moves into passages 67, 68 and 69 with the passage 69 leading to chamber 70 provided with tap outlet 71 to which the discharge line is coupled. The passage 69 is, however, blocked by an indicator piston 72 mounted in bore 73 extending normal to and intersecting the passage 69.

A tapped opening 74 concentric with the bore 73 is provide to receive an indicator piston stem housing 75 which has a central bore 76 therein which constitutes substantially a continuation of the bore 73. A reduced diameter opening 77 in the end wall of the housing accommodates the stem 78 of the piston 72. A spring 80 within the bore 76 engages a shoulder 81 on the piston and extends to the interior end wall of the bore 76 about the opening 77. This spring tends to urge the piston to the position shown in FIG. 3. An O-ring or like seal 83 provides a sliding seal between the piston 72 and the end of the bore 73 adjacent the housing 75.

Also positioned in series or in tandem with the indicator piston 72 in the bore 73 is a pilot piston 85. The end of the pilot piston adjacent the indicator piston is provided with a reduced diameter stop 86 and a vent passage 87 extends from the thus produced annular space between the indicator and pilot pistons in the position shown in FIG. 3 to the chamber 70.

The pilot piston is provided with an O-ring type seal 89 and a reduced diameter end portion 90 which extends through annular guide 91 provided in the end of bore enlargement 92. Such guide may be provided with interior and exterior seals as shown at 93 and a ring 94 between the guide and the shoulder provided between the enlargement and the bore 73 may serve as a stop for the piston in the position shown in FIG. 3. In such position, the reduced diameter portion 90 will project through the guide to be exposed to fluid within passage 67. A vent 95 may be employed leading to the bore enlargement to vent any fluid trapped between the ring 94 and the end or shoulder of the enlarged portion of the piston 85.

A major distinction between the FIG. 5 and the FIG. 6 embodiment is the mode of operation of the pilot piston. In FIG. 5, spring 46 is employed to return the pilot piston to its original position. In FIG. 6, this spring return of the pilot piston has been omitted. Instead, the pilot piston is now returned due to the difference in area at each end of the pilot piston exposed to the pressure in the line. In the reduced diameter portion 90, there is provided an exposed area 97 which is approximately ¼ the exposed area provided by the end 98. Therefore, the pilot piston 85 will move to the right from the FIG. 3 position due to a high line pressure acting on the end 97 pushing the indicator piston to the right against the pressure of spring 80. When the annular recess between the two pistons provided by the stop 86 reaches the passageway 69, the pilot and indicator pistons become separated and the indicator piston moves to the position shown in FIG. 6 and remains in such position as long as the proper fluid pressure is maintained in the discharge line. The fluid pressure in passage 69 which is the same as in passage 67 will, acting on the large area 98, exert more force on the pilot piston than the smaller area area 97 and the pilot piston will then immediately return to its original position and be held there by means of fluid pressure. As soon as the pressure in passageway 69 is exposed to the end 99 of the indicator piston, it will move to the right compressing spring 80 causing the shoulder 100 to abut against the inside wall of the housing 75 and visibly projecting the stem 78 through the openings 77 in such housing. It will, of course, be understood that, as in the FIG. 5 embodiment, the projection or extension of the stem through its housing may provide an electrical or mechanical indication in addition to the visible indication.

In the illustrated FIG. 6 embodiment, the ratio between the area 97 and the greater area 98 which is the same as the exposed area of the indicator piston is approximately 1:4. If, for example, the force exerted by spring 80 were 40 pounds and the fluid pressure building buildup required to move the pilot and indicator pistons against such spring pressure was 1600 pounds per square inch, then once the end 99 of the indicator piston had been exposed to the fluid pressure in the line, a system pressure of only 400 pounds per square inch would then be necessary to maintain the indicator piston in its projected FIG. 6 position. Thus 1600 pounds on the area 97 would be required to compress the spring 80 whereas only 400 pounds on the area 99 would be required to compress spring 80. It is, of course, understood that the indicated fluid pressures and area ratios are exemplary only and that other fluid presures could be employed as well as varying area ratios and also varying spring pressures.

Figure 7:
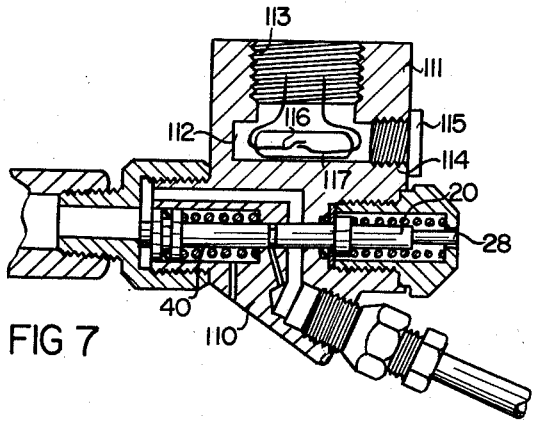
FIG. 7 is a fragmentary sectional view similar to FIG. 2 showing one form of electrical indicator that may be employed with the present invention.

Referring now to FIG. 7, there is a slightly modified form of the valve shown in FIGS. 2 and 5 wherein the valve body 110 is provided with a housing extension 111 having an opening 112 therein. The housing may preferably be made of aluminum and such opening may be provided with tapped top and lateral access openings 113 and 114 with a plug 115 being shown in the opening 114. A multi-poised dry reed snap switch may be mounted in the opening 112 to have the contacts 116 and 117 thereof opened and closed in response to movement of one or both of the pistons 40 or 20. Preferably, the left hand or pilot piston 40 will be magnetized and the switch will operate in response to movement thereof. However, it will be understood that either or both pistons may be magnetized. Such magnetic reed switches are generally conventional and may be obtained, for example, from Hamlin, Inc., Lake Mills, Wisconsin, or Gordos Corporation, Bloomfield, New Jersey. It will, of course, be understood that the projection of the plunger 28 may also be employed to snap or throw a switch mechanism to provide the desired indication.

It can now be seen there is provided a broken discharge line indicator and shut-off which is easily and simply operated by a pilot from the line pressures.

Other modes of applying the principle of the invention may be employed, change being made as regards the details described, provided the features stated in any of the following claims or the equivalent of such be employed.

I, therefore, particularly point out and distinctly claim as my invention:

1. A broken line indicator and shut-off for lubricating systems and the like comprising an indicator piston, line pressure piston means operative to move said indicator piston from a line blocking to a line opening position exposing an end thereof to line pressure, and means responsive to a predetermined minimum pressure in such line to return said indicator piston to a line blocking position.

2. A broken line indicator and shut-off as set forth in claim 1 including an indicator stem on said indicator piston giving a visual indication of the position of said indicator piston.

3. A broken line indicator and shut-off as set forth in claim 1 including spring means operative to urge said indicator piston to its line blocking position.

4. A broken line indicator for a lubricating system and the like comprising a pilot piston and an indicator piston in tandem, means to move said indicator piston in response to movement of said pilot piston to expose an end of said indicator piston to line pressure, and means to return said pilot piston to its original position.

5. A broken line indicator for a lubricating system and the like comprising a pilot piston and an indicator piston, means mounting said pilot and indicator pistons for conjoint movement in end-to-end relationship, line pressure means to move said pilot piston thus to move said indicator piston to expose an end of said indicator piston to line pressure, and means to return said pilot piston to its original position.

6. A broken line indicator as set forth in claim 5 wherein said means to return said pilot piston comprises a spring.

7. A broken line indicator as set forth in claim 5 wherein said means to return said pilot piston comprises a larger area on one end thereof exposed to line pressure.

8. A broken line indicator as set forth in claim 5 including spring means acting on said indicator piston to oppose movement to expose an end thereof to line pressure.

9. A broken line indicator for lubricating systems and the like comprising a pair of pistons mounted in tandem, one of said pistons in one position thereof being adapted to block said line, spring means urging said one piston to such line blocking position, the other said piston being exposed to said line ahead of such blockage and upon an increase in pressure therein, said other piston moving said one piston against the pressure of said spring to open said line while simultaneously exposing the end of said one piston to said line to maintain said piston in its line opening position, said spring means being of a selected magnitude to move said one piston to its line closing position upon a predetermined drop in line pressure.

10. A broken line indicator as set forth in claim 9 including return means to reposition said other piston after having exposed the end of said one piston to said line.

11. A broken line indicator as set forth in claim 10 wherein said return means comprises a spring.

12. A broken line indicator as set forth in claim 10 wherein said return means comprises area differentials on the ends of said other piston.

13. A broken line indicator for lubricating systems and the like comprising a pilot piston and an indicator piston, means urging said indicator piston to a line blocking position, means responsive to an increase in pressure in said line operative to move said pilot piston and thus said indicator piston to a line opening position exposing an end of said indicator piston to such line pressure, such line pressure acting on the end of said indicator piston thus exposed to maintain such line open as long as such line pressure is sufficient to overcome said means urging said indicator piston to a line blocking position.

14. A broken line indicator as set forth in claim 13 including return means for said pilot piston operative to return said pilot piston after having exposed the end of said indicator piston to line pressure.

15. A broken line indicator as set forth in claim 14 wherein said return means comprises a spring acting on said pilot piston.

16. A broken line indicator as set forth in claim 14 wherein said return means comprises area differences in the opposite ends of said pilot piston, both exposed to said line pressure.

17. A broken line indicator and shut-off for lubricating systems and the like comprising an indicator piston, means operative to move said indicator piston from a line blocking to a line opening position exposing an end thereof to line pressure, means responsive to a predetermined minimum pressure in such line to return said indicator piston to a line blocking position, said first mentioned means including a pilot piston in tandem with said indicator piston, one end of said pilot piston being exposed to line pressure whereby an increase in line pressure will cause said pilot piston to engage and move said indicator piston from a line blocking to a line opening position.

18. A broken line indicator for a lubricating system and the like comprising a pilot piston and an indicator piston, means to move said indicator piston in response to movement of said pilot piston to expose an end of said indicator piston to line pressure, means to return said pilot piston to its original position, electrical indicator means, and means responsive to the position of said pilot piston operative to actuate said electrical indicator means.

19. A broken line indicator for a lubricating system and the like comprising a pilot piston and an indicator piston, means to move said indicator piston in response to movement of said pilot piston to expose an end of said indicator piston to line pressure, means to return said pilot piston to its original position, said pilot piston being magnetized, and magnetic switch means operative in response to said magnetized pilot piston operative to give an electrical indication of the position thereof.

20. A broken line indicator for a lubricating system and the like comprising a pilot piston and an indicator piston, means to move said indicator piston in response to movement of said pilot piston to expose an end of said indicator piston to line pressure, means to return said pilot piston to its original position, said indicator piston being magnetized, and magnetic switch means operative in response to said magnetized indicator piston operative to give an electrical indication of the position thereof.

References Cited in the file of this patent

UNITED STATES PATENTS

| | | |
|---|---|---|
| 1,942,096 | Hallerberg | Jan. 2, 1934 |
| 2,962,044 | Charboneau | Nov. 29, 1960 |